Jan. 25, 1955     H. M. HENION     2,700,169
AIRCRAFT LOADING AND UNLOADING ARRANGEMENT
Filed March 4, 1949     3 Sheets-Sheet 1

HENRY M. HENION   INVENTOR.

BY
J. Allen Jones
ATTORNEY

Jan. 25, 1955        H. M. HENION        2,700,169

AIRCRAFT LOADING AND UNLOADING ARRANGEMENT

Filed March 4, 1949        3 Sheets-Sheet 2

HENRY M. HENION    INVENTOR.

BY J. Allen Jones
ATTORNEY

HENRY M. HENION INVENTOR.

BY
*J. Allen Jones*
ATTORNEY

United States Patent Office 2,700,169
Patented Jan. 25, 1955

2,700,169

AIRCRAFT LOADING AND UNLOADING ARRANGEMENT

Henry M. Henion, Chevy Chase, Md.

Application March 4, 1949, Serial No. 79,675

2 Claims. (Cl. 14—72)

This invention relates to a device for loading and unloading aircraft, and more particularly to a device for providing a convenient and readily adjustable passageway for passengers between terminal buildings and aircraft.

Recent trends in the design of airport terminal buildings include the use of passenger accommodating facilities on a second floor level, rather than on the ground floor, since the function of baggage and cargo handling, which is a separate function, is essentially a ground level operation. This trend in airport terminal building design has also been accompanied by a trend to the use of aircraft of larger sizes, all of which require some type of stair arrangement for passengers embarking and disembarking from the aircraft, assuming of course that the passengers enter the aircraft from the ground level. With the larger types of aircraft now in use, the door through which the passengers enter and leave the plane is often more or less on the level with the second floor of the terminal, so that prior to this invention, the passengers would have to walk or ride from the second floor passenger accommodations down to the ground floor, and then walk up stairs to enter the planes. The same procedure would be followed in reverse when the passengers are unloaded from the plane.

To facilitate the passenger flow from second floor passenger facilities to passenger aircraft, and vice versa, and also for use in loading aircraft from ground floor levels, this invention provides a movable gangway or passageway through which the passengers can be channeled for movement between a terminal building and the aircraft. Where upper floor passenger facilities are provided in the terminal, the passengers remain substantially on a single level during movement to and from the aircraft. The passengers using the passageway are thus kept out of the way of the baggage handlers, mechanics, and other maintenance personnel, and the passengers are also kept away from possible injury by trucks, whirling propellers, etc. With the advent of front loading entranceways in some of the newer aircraft, the whirling propellers have become an increased hazard, and the use of the invention becomes even more desirable.

One object of the invention is the provision of a movable type of gangplank or passageway for the use described above.

Another object of the invention is the provision of a gangplank for permitting direct loading and unloading of aircraft from and to passenger accommodations of terminal buildings, in which provision is made for moving of the passageway to various positions to accommodate different types of aircraft and different levels of the terminal building entrance.

A further object of the invention is to provide a movable passageway for loading and unloading aircraft, in which the passageway may be moved about independently of the terminal building, and may thus be used with a plurality of entrance openings to the building.

Another object of the invention is to provide a passenger gangplank for loading and unloading aircraft, in which the gangplank is permanently attached to the building at one end, a flexible connection being provided at the point of attachment to the building, so that the other end of the passageway can be moved about by means carried by the building or independent of the building, thus providing considerable flexibility of use.

Another object of the invention is the provision of a passageway for loading and unloading aircraft, in which the passageway has an extendible and retractable portion for permitting use of the arrangement with aircraft positioned at varying distances from the terminal building.

A further object of the invention is the provision of a loading and unloading device for aircraft which is usable not only by passengers, but also for cargo, and in which complete protection of the users from the elements is provided. However, if such protection is not desired, the arrangement can omit the covering.

Still another object of the invention is the provision of a passageway for loading and unloading aircraft, in which the passageway is supported entirely by self-propelled units which also include means for raising and lowering independently the two ends of the passageway to accommodate varying loading situations.

These and other objects of the invention will be apparent from the following specification taken in conjunction with the accompanying drawings, in which Fig. 1 is a side elevational view of a preferred embodiment of the invention with the covering of the passageway removed to show the internal structure;

Figure 7:
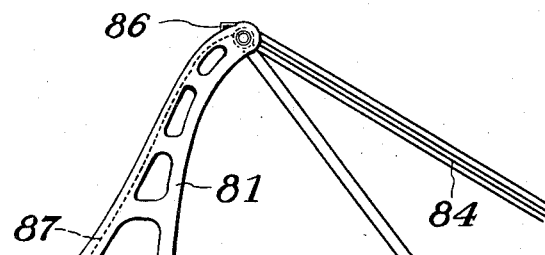
Figure 8:
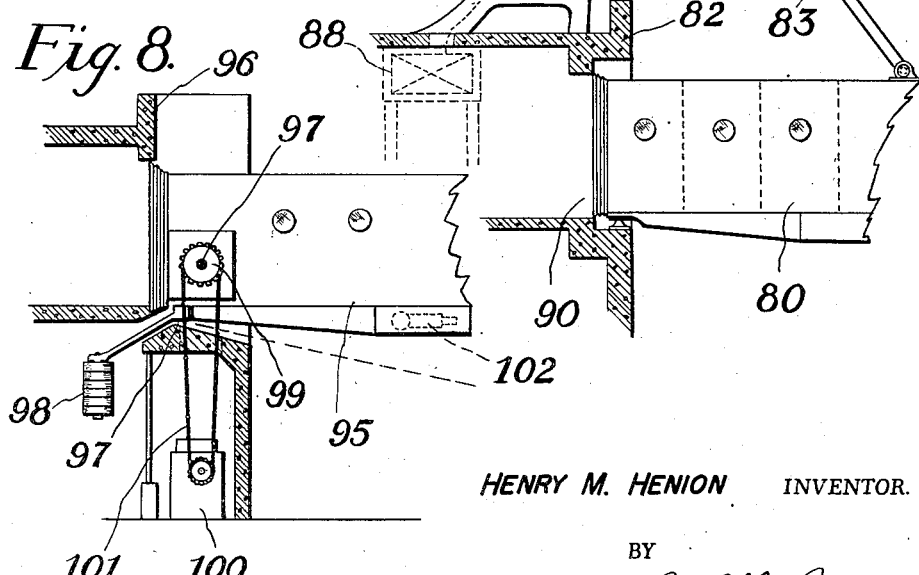

Fig. 7 is a side elevational view, partly in section, showing a modified form of the invention in which the passageway is permanently attached to the building and is movable by means of a crane carried by the building; and Fig. 8 is a view similar to Fig. 7, but showing still another modification of the invention in which the passageway is movable about a shaft carried by the building, and in which a counterbalance is used with the passageway.

Figure 1:
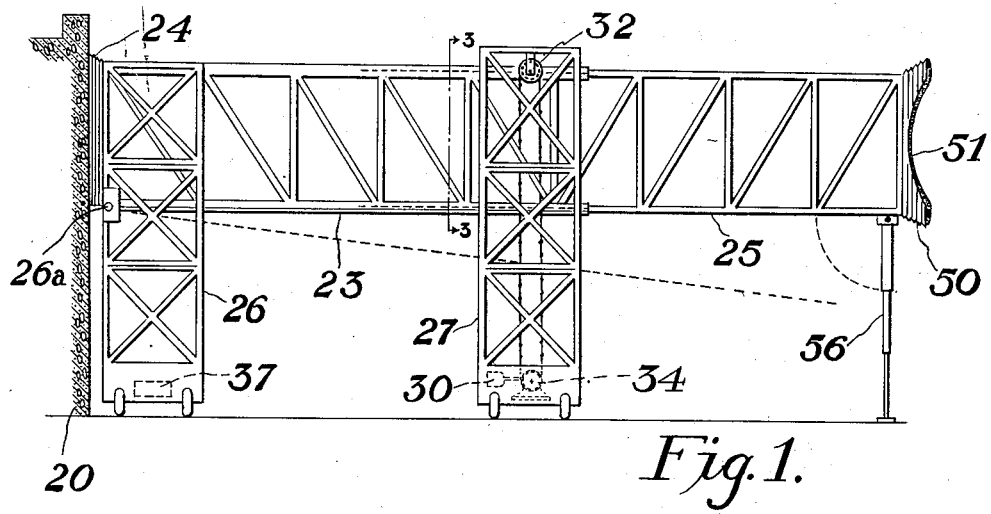
Figure 2:
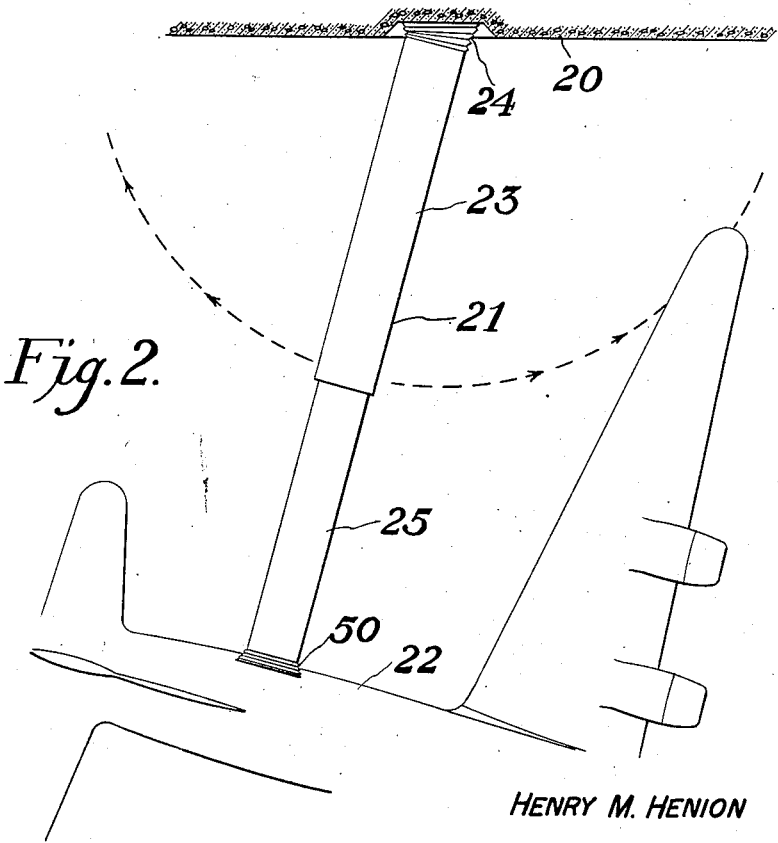
Fig. 2 is a top plan view showing the range of flexibility and the general use of the type of passageway or gangway comprising this invention.

Referring now to the drawings in detail, Figures 1 and 2 show the general application of the invention. There is shown in these figures a building comprising the airport terminal, and denoted by the reference numeral 20, and a gangplank or a covered passageway 21 is provided for the passengers entering or leaving aircraft 22. The passageway is comprised of a basic section 23 attached to the building 20 by means of a flexible accordion-like arrangement 24, and an extendible section 25 which is supported by basic section 23 for telescoping movement relative to the basic section. The passageway is preferably variable in length by means of the telescoping arrangement just described, and is also movable both horizontally and vertically in an arcuate manner about its point of attachment to the building 20.

In the embodiment of Figs. 1–4, which is the preferred embodiment, the basic section 23 of the passageway is supported by wheeled carriages 26 and 27 positioned respectively near the point of attachment to the building 20, and near the outer end of the basic section. These carriages are preferably self-propelled by means such as motors 28, so that the passageway can be moved about as shown by the arcuate dotted line in Fig. 2, to accommodate various locations of the aircraft being loaded and unloaded, and a single passageway can be moved along the terminal building for use in connection with a plurality of entrances to the building. This arrangement also facilitates movement of the passageway to any desired storage space when not in use, or, if desired, passageways not in use can be swung to a position flat against the wall of the terminal building.

It may be desirable for both of the carriages 26 and 27 to have means for raising and lowering the portions of the passageway supported thereby, but in Fig. 1, only the carriage 27 is shown with such means. My invention includes the use of any convenient type of elevating arrangement on the carriages, such as rack and pinion, electric, gasoline, pneumatic, hydraulic, or any type of suitable arrangement, either manually or power operated. If power operation is used, the carriages can be provided with their own power sources such as batteries 30, internal combustion engines, or the like, or electric power may be obtained from the terminal building by any convenient wiring connections.

Figure 3:
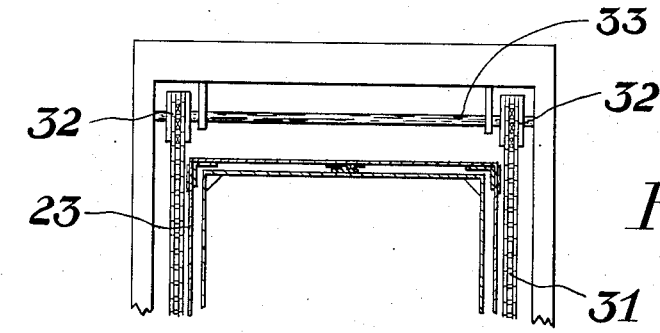
Fig. 3 is a view taken approximately on line 3—3 of Fig. 1, and showing one of the movable elevating supports for the passageway.
Figure 4:
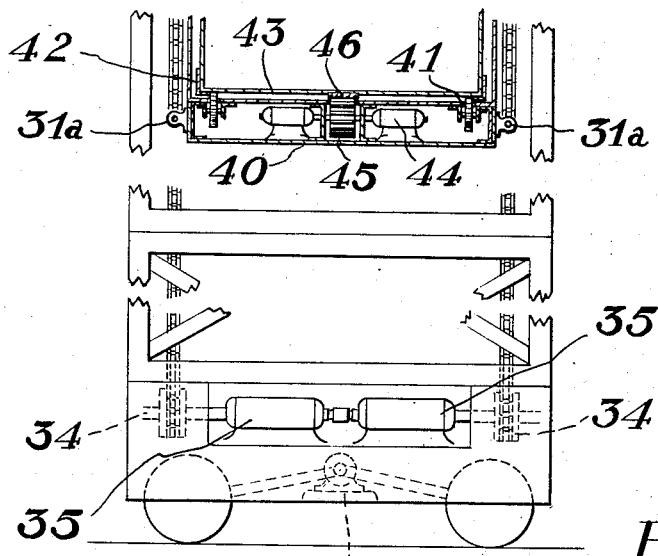
Fig. 4 is a fragmentary detail view showing the manner of attaching the cover of the passageway to the terminal building in the case of detachable passageways.

As shown in Figs. 1 and 3, the basic section 23 is supported in a vertically movable manner by endless chains or link belts 31 positioned on either side of the passageway and each attached thereto at a point 31a. These belts pass over pulleys or sprockets 32 carried by shaft 33, and are driven by their engagement with gears 34 on the shafts of one or more motors 35. The motor is preferably reversible and the outer end of the passageway is raised or lowered, depending upon the direction of rotation of motors 35. The same result could, of course, be accomplished by reversing gearing used with unidirectional motors.

While it is not always necessary that carriage 26 have the raising and lowering structure just described in connection with carriage 27, it is desirable that carriage 26 have self-propulsion means similar to the motor 28 of Fig. 3, and such means are shown at 37 in a diagrammatic manner. As shown, carriage 26 has a pivot 26a about which the passageway moves when the outer end is raised or lowered.

The general cross-sectional construction of the sections 23 and 25 of the passageway, including the manner of moving section 25 in a telescoping fashion relative to section 23, is shown in detail in Fig. 3. In this figure, the basic section 23 is shown with a reinforced base 40 which carries rollers 41 near its edges to support longitudinally extending channel members 42 comprising part of the structure for supporting the flooring 43 of the section 25.

One or more motors 44 carried by base 40 of section 23 drive a pinion gear 45 which cooperates with a rack 46 attached to the underside of the support for flooring 43. This rack and pinion arrangement provides a simple means for effecting reciprocation of section 25, and the motors 44 can be controlled and supplied with power from such source of power, such as battery 30, as is provided for operating other motors on the carriage 27.

Section 25 carries on its outer end a flexible sealing member 50 which may be of sponge rubber or other suitable material which will adjust itself to the configuration of the aircraft being loaded or unloaded, and will form a weather tight seal at the point where the covered passageway contacts the airplane. As shown in Fig. 1, the member 50 is concave in configuration at 51 so as to approximate the external curvature of an aircraft fuselage. By urging the sealing member 50 tightly against the aircraft when the section 25 is moved outwardly by motors 44, a seal is provided which assures protection of passengers from the elements and from propeller blast during movement between the terminal building and the aircraft.

The seal at the terminal end of section 23 may conveniently be in the form of an accordion-like collapsing element 24 (Fig. 4) which may be attached to the terminal building by any convenient detachable means, such as by a button and buttonhole arrangement 53, 54, by snap fasteners, or other suitable devices.

The outermost end of section 25 may also be conveniently provided with a prop 56 for firm support of the extreme outer end of this section. The prop 56 is preferably of collapsible construction, such as by telescoping, and may be operated by fluid pressure, by hand through a rack and pinion arrangement, by a power or hand driven screw, or by any convenient means. In some installations, it may be desirable to replace or supplement prop 56 with a caster-like arrangement (not shown) to provide additional support for section 25.

Figure 5:
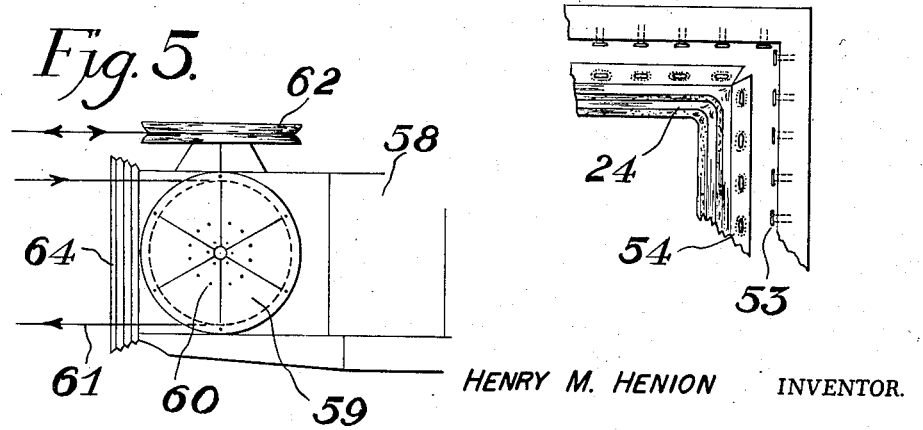
Fig. 5 is a side elevational view of the end portion of a modified form of passageway construction showing the use of cables and wheels for orienting the passageway.

In Fig. 5, I have shown a modified form of arrangement for use with a passageway section 58 intended for operation with a single entrance doorway into a terminal building. In this embodiment, the section 58 is fixed to a gear or pulley wheel 59 which is movable about a horizontal axis 60 by cable or belt 61, thus providing for movement of the passageway section about such a horizontal axis. A gear or pulley wheel 62 is also fixed to the section 58 and is movable about a vertical axis by a cable or belt 63 to move passageway section 68 about a vertical axis. The numeral 64 represents the flexible connection to the terminal.

Figure 6:
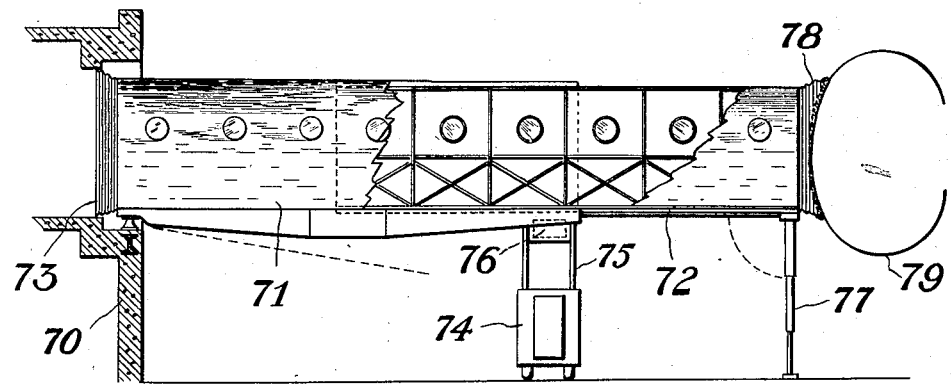
Fig. 6 is a side elevational view of a modified form of the invention in which one end of the passageway is permanently secured to the building.

In Fig. 6 is shown a terminal 70 with a passageway 71, 72 of the general construction shown in Figs. 1–4 except that section 71 is mounted on the terminal for use only with a single entrance 73, and therefore only a single carriage 74 is provided, its function being to move the passageway 71, 72 in an arc about its point of attachment to the terminal, both about a horizontal axis and about a vertical axis. Carriage 74 is different from either carriage shown in Fig. 1 in that it uses fluid pressure operated means for raising the passageway, the piston rods of the pressure operated means being shown at 75. The operating means for reciprocating section 72 is shown at 76. A prop 77 similar to prop 56 is used, as is a flexible seal 78 similar to seal 50 for cooperation with the aircraft shown at 79.

Operation of a passageway 80 by means of an overhead derrick 81 mounted on the terminal 82 is shown in Fig. 7. Cables 83 support the inner section of the passageway and another set of cables 84 may be attached to the outer section (not shown) of the passageway. The cables may be controlled by a power source such as a motor 86 controlled through wiring 87 in derrick 81 from a control panel 88 in the terminal. In this embodiment, the passageway 80 is permanently attached to the terminal at the particular entrance 90 with which it is used.

Fig. 8 shows an installation of a permanent nature in which the passageway 95 is pivoted to the terminal building 96 about an axis 97, with a counterweight 98 being attached to the passageway to balance, at least partially, the weight of the passageway and its users. A gear wheel 99 is attached to the passageway with its axis at 97, and a power source 100 drives the gear 99 through a chain 101 to raise and lower the outer end of the passageway. In this embodiment, an electric motor arrangement for reciprocating the outer section (not shown) of the passageway 95 is shown at 102.

It should be understood that the embodiments of the invention shown and described herein are given merely in an illustrative manner, and that the invention is not to be considered as limited thereto, but rather to be capable of various other embodiments without departing from the inventive concept as defined by the appended claims.

I claim:
1. A passenger loading and unloading arrangement adapted to be connected to a terminal building wherein the building entrance is at least one floor level above ground, a passageway comprising a main tubular section and a second tubular section telescoping therewith, means pivotally supporting the inner end of the main tubular section for horizontal and vertical movement, and means disposed adjacent the free end of said main tubular section for supporting the passageway, said means comprising a wheeled structure whereby the passageway may be swung in an arc about the inner end of the main section, said means including elevating means for raising and lowering the free end of the passageway.

2. A passenger loading and unloading arrangement as recited in claim 1 further including power driven means for telescoping said second section inwardly and outwardly of the main section.

References Cited in the file of this patent

UNITED STATES PATENTS

| Number | Name | Date |
|---|---|---|
| 849,222 | Fleming | Apr. 2, 1907 |
| 855,745 | Argall | June 4, 1907 |
| 1,106,074 | Bidlake | Aug. 4, 1914 |
| 1,160,506 | Goss | Nov. 16, 1915 |
| 1,518,759 | Sayers | Dec. 9, 1924 |
| 1,759,085 | Bebinger | May 20, 1930 |
| 2,448,335 | Wallace | Aug. 31, 1948 |
| 2,470,337 | Campbell | May 17, 1949 |
| 2,478,177 | Beutel et al. | Aug. 9, 1949 |
| 2,498,819 | Noville | Feb. 28, 1950 |
| 2,581,293 | Read et al. | Jan. 1, 1952 |

FOREIGN PATENTS

| Number | Country | Date |
|---|---|---|
| 111,065 | Austria | Oct. 25, 1928 |
| 353,257 | Great Britain | July 23, 1931 |

OTHER REFERENCES

Aero Digest, "Pre-Packed Containers for Air Cargo," pages 77, 121 and 122, Nov. 15, 1945.